US010850226B2

(12) United States Patent
Peters, Jr. et al.

(10) Patent No.: US 10,850,226 B2
(45) Date of Patent: Dec. 1, 2020

(54) SYSTEMS AND METHODS FOR HIGH CO2 AMMONIA PURIFICATION

(71) Applicant: Bechtel Hydrocarbon Technology Solutions, Inc., Houston, TX (US)

(72) Inventors: Arlin Peters, Jr., Kensington, CA (US); Martin Taylor, Houston, TX (US)

(73) Assignee: BECHTEL HYDROCARBON TECHNOLOGY SOLUTIONS, INC., Houston, TX (US)

( * ) Notice: Subject to any disclaimer, the term of this patent is extended or adjusted under 35 U.S.C. 154(b) by 0 days.

(21) Appl. No.: 15/580,849

(22) PCT Filed: Jun. 10, 2016

(86) PCT No.: PCT/US2016/036845
§ 371 (c)(1),
(2) Date: Dec. 8, 2017

(87) PCT Pub. No.: WO2016/201195
PCT Pub. Date: Dec. 15, 2016

(65) Prior Publication Data
US 2018/0326347 A1    Nov. 15, 2018

Related U.S. Application Data

(60) Provisional application No. 62/173,675, filed on Jun. 10, 2015.

(51) Int. Cl.
*B01D 53/14*    (2006.01)

(52) U.S. Cl.
CPC ......... *B01D 53/1406* (2013.01); *B01D 53/14* (2013.01); *B01D 53/1475* (2013.01); *B01D 53/1493* (2013.01); *B01D 2252/103* (2013.01); *B01D 2256/22* (2013.01); *B01D 2257/406* (2013.01); *B01D 2257/504* (2013.01); *Y02C 20/40* (2020.08)

(58) Field of Classification Search
CPC .......... B01D 2252/103; B01D 2256/22; B01D 2257/406; B01D 2257/504; B01D 53/14; B01D 53/1406; B01D 53/1475; B01D 53/1493; Y02C 10/08
See application file for complete search history.

(56) References Cited

U.S. PATENT DOCUMENTS

| | | | |
|---|---|---|---|
| 2,245,130 A | | 6/1941 | Guillissen |
| 2,756,841 A | | 7/1956 | Asendorf et al. |
| 2,785,045 A | * | 3/1957 | Wan et al. ............... C01C 1/12 |
| | | | 423/229 |
| 3,107,149 A | | 10/1963 | Wentworth et al. |
| 3,684,442 A | | 8/1972 | Keizo |
| 4,308,385 A | | 12/1981 | Goorden |

(Continued)

OTHER PUBLICATIONS

Lee W. Young, International Search Report and Written Opinion, PCT Application No. PCT/US16/36845, dated Sep. 6, 2016, 8 pages, International Searching Authority, Alexandria, Virginia.

(Continued)

*Primary Examiner* — Cabrena Holecek
(74) *Attorney, Agent, or Firm* — Crain, Caton and James

(57) ABSTRACT

Systems and methods for removing CO2 from an ammonia stream using a warm water wash in a multi-stage water wash with varying temperatures.

12 Claims, 3 Drawing Sheets

(56) References Cited

U.S. PATENT DOCUMENTS

| | | | |
|---|---|---|---|
| 2013/0186272 A1* | 7/2013 | Balfe | B01D 53/1406 95/228 |
| 2017/0072338 A1* | 3/2017 | Taylor | C01C 1/12 |

OTHER PUBLICATIONS

Stanley Silverman, International Preliminary Report on Patentability, PCT Application No. PCT/US16/36845, dated Jul. 5, 2017, 7 pages, International Preliminary Examining Authority, Alexandria, Virginia.

Asoka Dias-Abey, Examination Report No. 1, Australian Patent Application No. 2016274861, dated Jul. 3, 2018, 3 pages, Australian Government IP Australia, Australia.

David J Tadgell, Response to Exam Report, Australian Patent Application No. 2016274861, dated Sep. 27, 2018, 13 pages, Phillips Ormonde Fitzpatrick, Australia.

Eng. Sattam M. Almutairi, Examination Report, GCC Application No. 2016-31442, dated Jan. 27, 2019, 3 pages Patent Office of the Cooperation Council for the Arab States of the Gulf, Saudi Arabia.

Al Hadaf Services, LLC, Reply to Examination Report, GCC Application No. 2016-31442, dated Mar. 11, 2019, 2 pages Al Hadaf Services, LLC, Saudi Arabia.

Reena Singh, Examination Report, Indian Patent Application No. 201717043628, dated Mar. 3, 2019, 6 pages, Intellectual Property India, India.

Eng. Sattam M. Almutairi, Examination Report, GCC Patent Application No. 2016-31442, dated Nov. 3, 2018, 3 pages, Patent Office of the Cooperation Council for the Arab States of the Gulf, GCC.

Tarun Khurana, Response to First Exam Report, IN App. No. 201717043628, dated Jul. 17, 2019, 14 Pages, Khurana & Khurana Advocates and IP Attorneys, India.

Tarun Khurana, Response to Hearing, Application Number 201717043628, dated Oct. 7, 2019, 25 pages, Khurana and Khurana, Advocates & IP Attorneys, India.

Beyond Attorney at Law, Response to Office Action, Chinese Patent Application No. 201680033325.7, dated Jul. 15, 2020, 6 pages, Beyond Attorneys at Law, China.

* cited by examiner

SYSTEMS AND METHODS FOR HIGH CO2 AMMONIA PURIFICATION

CROSS-REFERENCE TO RELATED APPLICATIONS

This application claims the priority of PCT Patent Application No. PCT/US16/36845, filed on Jun. 10, 2016, which claims priority of U.S. Provisional Patent Application No. 62/173,675 filed Jun. 10, 2015. Both of which are incorporated herein by reference. This application, PCT Patent Application Serial No. PCT/US15/19009, PCT Patent Application Serial No. PCT/US15/19015, and PCT Patent Application Serial No. PCT/US15/59560, which are incorporated herein by reference, are commonly assigned to Bechtel Hydrocarbon Technology Solutions, Inc.

FIELD OF THE DISCLOSURE

The present disclosure generally relates to systems and methods for high CO2 ammonia purification. More particularly, the present disclosure relates to removing CO2 from an ammonia stream using a warm water wash in a multi-stage water wash with varying temperatures.

BACKGROUND

Conventional technology separately recovers hydrogen sulfide (H2S) and ammonia (NH3) from sour water using an H2S stripper and an NH3 stripper, which is sometimes referred to as a two-column sour water stripping process. This process yields acid gas (H2S) with less than 50 ppmw NH3 and a high purity gaseous or liquid NH3 product. The separated water is of excellent quality, making it suitable for reuse as coke drum quench water, crude unit desalter water, and hydro-processing unit injection water or it may be sent to effluent treating for discharge. If there are high levels of carbon dioxide (CO2) in the sour water, then salts may form in the presence of NH3 during the two-column sour water stripping process.

A two-column sour water stripping process typically includes four main processing stages: 1) degassing and feed preparation; 2) H2S stripping; 3) NH3 stripping; and 4) NH3 purification and liquefaction. Referring now to FIGS. 1A and 1B, a schematic diagram of a conventional two-column sour water stripping system illustrates the four processing stages. The following pressures and temperatures are exemplary and only for purposes of illustration.

Degassing and Feed Preparation:

Sour water feeds 102 from a single or several sources are combined with a recycle stream 104 from the NH3 stripper 106, which are cooled and passed through a degasser 108 where dissolved hydrogen (H2), methane (CH4) and other light hydrocarbons are removed as a hydrocarbon vapor stream 105. The sour water feeds 102 include dissolved NH3 and H2S. The recycle stream 104 includes rich NH3, which helps keep acid gases in solution in the degasser 108, thereby minimizing the release of acid gas and possible air pollution. The degassed sour water stream 109 is sent to a deoiler 103, which removes free oil from the degassed sour water stream 109 to produce a degassed/deoiled sour water stream 107. The degassed/deoiled sour water stream 107 is pumped to a feed preparation tank 110, which serves to attenuate flow rate and composition changes while also providing the opportunity to remove entrained oil and solids. The feed preparation tank 110 produces a processed sour water stream 111, which is pumped to a feed coalescer unit 112 that filters solids remaining in the processed sour water stream 111 and further separates entrained oil to produce a hydrocarbon liquid 113 and a deoiled sour water stream 115. The deoiled sour water stream 115 is sent to a feed/product exchanger 114, which acts as a heat exchanger to heat the deoiled sour water stream 115 and cool the NH3 stripper bottoms stream 132 to produce a heated deoiled sour water stream 116 and the stripped water stream 134. In this manner, the components comprising the NH3 stripper bottoms stream 132, stripped water stream 134 and the components comprising the deoiled sour water stream 115, heated deoiled sour water stream 116 are, respectively, the same but may have different concentrations and temperatures. The heated deoiled sour water stream 116 is then sent to an H2S stripper 118.

H2S Stripping:

The H2S stripper 118 contains trays or packing (not shown) that the heated deoiled sour water stream 116 flows through and around to separate H2S from the heated deoiled sour water stream 116. A cooled reflux water stream (e.g. water wash) 136 is used remove heat and suppress evolution of gaseous NH3 in the H2S stripper. A reboiler 137 acts as a heat exchanger to provide the energy required to i) heat the heated deoiled sour water stream 116 and the cooled reflux water stream 136 to a preferred temperature; and ii) strip out H2S from the heated deoiled sour water stream 116. The resulting H2S stripper overheads stream 120 is sent to a knock out drum 138 to substantially remove any entrained droplets and produce H2S stream 126. The H2S stream 126 is of high purity and is an excellent feed for a sulfur recovery unit (SRU) or a sulfuric acid plant. It contains a negligible amount of NH3 (less than 50 ppmw) and very little hydrocarbons since the sour water feeds 102 have been degassed. The H2S stream 126 is available at about 100-180 psig and 100-120° F. The resulting H2S stripper bottoms stream 130, which contains NH3 and some H2S, is sent directly to the NH3 stripper 106.

NH3 Stripping:

The NH3 stripper 106 is a steam re-boiled, refluxed distillation column. In the NH3 stripper 106, essentially all NH3 and any remaining H2S are removed from the H2S stripper bottoms stream 130, which leaves the NH3 stripper 106 as an NH3 stripper bottoms stream 132. The NH3 stripper bottoms stream 132 is sent to the feed/product exchanger 114 where heat is exchanged with the deoiled sour water stream 115 and the NH3 stripper bottoms stream 132 is cooled to form the stripped water stream 134. The stripped water stream 134 is suitable for many plant reuse needs or may be discharged. The containment levels of H2S and NH3 in the stripped water stream 134 may be tailored to individual requirements and is typically 10-50 ppmw NH3 and 1-25 ppmw H2S. The stripped water stream 134 is available at about 100-200° F. In the NH3 stripper 106, essentially all NH3 and any remaining H2S are removed from the H2S stripper bottoms stream 130, which leaves the NH3 stripper 106 as an NH3 stripper overheads stream 133. The NH3 stripper overheads stream 133 is sent to an overhead condenser where it is converted to an NH3 vapor stream and an NH3 liquid stream. A knock-out drum 139 separates the NH3 vapor stream 140 and the NH3 liquid stream 150. The NH3 vapor stream 140 exits the knock-out drum 139 at about 90° F. to 140° F. A portion of the NH3 liquid stream 150 is returned as reflux to the NH3 stripper 106 and another portion of the NH3 liquid stream 150 forms the recycle stream 104. A reboiler 141 acts as a heat exchanger to provide the energy required to remove NH3 and any remaining H2S. The NH3 vapor stream 140 is an NH3-rich gas, which may be processed in a variety of ways.

NH3 Purification and Liquefaction:

Referring now to FIG. 1B, the NH3 vapor stream 140 is sent to a cool water wash 142 to remove residual amounts of H2S and some hydrocarbons. This step is also referred to as water scrubbing, which produces a scrubbed NH3 vapor stream 160. The cool water wash 142 typically operates at about 40° F. to about 60° F. Because ammonia, water, and carbon dioxide (CO2) can form salts at these temperatures in the cool water wash 142, these salts may deposit in the cool water wash 142 and other downstream components in the two-column sour water stripping process. As a result, these components may become plugged and thus, less efficient or inoperable. If NH3 recovery is not desired or economic, the scrubbed NH3 vapor stream 160 may be incinerated. In most cases, however, it is desirable to further purify the scrubbed NH3 vapor stream 160 to produce either an anhydrous liquid NH3 stream 170 or an aqueous NH3 stream 180 suitable for commercial use. In order to further purify the scrubbed NH3 vapor stream 160, the scrubbed NH3 vapor stream 160 is sent to a caustic wash 144 to remove residual contaminants including some hydrocarbons. This step is also referred to as caustic scrubbing, which produces a double scrubbed NH3 vapor stream 162 and may be necessary when problems are expected with process upsets, carbon dioxide, or complex sulfur compounds (e.g. mercaptans or disulfides). The double scrubbed NH3 vapor stream 162 may be sent to either a compressor 146 or a refrigeration unit 148 to produce the anhydrous liquid NH3 stream 170, which contains a negligible amount of H2S (less than 5 ppmw). The anhydrous liquid NH3 stream 170 is available at about 200 psig and 100° F. if liquefied by compression and at atmospheric pressure and about −26° F. if liquefied by cooling. Cooling water and/or a refrigerant may be used to exchange heat with the double scrubbed NH3 vapor stream 162. The double scrubbed NH3 vapor stream 162 may also be sent to an NH3 absorber 149, which is essentially another water wash, to produce the aqueous NH3 stream 180, which contains a negligible amount of sulfur (no more than about 2 ppmw). The aqueous NH3 stream 180 is available at about 35 psig and 100° F.

SUMMARY OF THE DISCLOSURE

The present disclosure overcomes one or more of the prior art disadvantages by providing systems and methods for removing CO2 from an ammonia stream using a warm water wash in a multi-stage water wash with varying temperatures.

In one embodiment, the present disclosure includes a system for separating carbon dioxide from ammonia, which comprises: i) an ammonia vapor stream, wherein a temperature of the ammonia vapor stream is about 90° F. to about 140° F. and the ammonia vapor stream comprises ammonia and carbon dioxide; ii) a water wash downstream from the ammonia vapor stream, wherein an operating temperature in the water wash is within about ±25° F. of a temperature of the ammonia vapor stream; iii) a carbon dioxide scrubbed ammonia vapor stream downstream from the water wash, the carbon dioxide scrubbed ammonia vapor stream comprising ammonia and trace amounts of carbon dioxide; and iv) another water wash downstream from the carbon dioxide scrubbed ammonia vapor stream, wherein a distance between the water wash and an upstream knock-out drum is less than a distance between the water wash and the another water wash.

In another embodiment, the present disclosure includes a method for separating carbon dioxide and ammonia, which comprises: i) introducing an ammonia vapor stream into a water wash, wherein a temperature of the ammonia vapor stream is about 90° F. to about 140° F. and the ammonia vapor stream comprises ammonia and carbon dioxide; ii) introducing at least one of water and a contaminated liquid stream from a bottom of the water wash into the water wash at a temperature that is within about ±25° F. of a temperature of the ammonia vapor stream; and iii) separating carbon dioxide and the ammonia in the ammonia vapor stream using at least one of the water and the contaminated liquid stream, which forms a carbon dioxide scrubbed ammonia vapor stream and the contaminated liquid stream.

Additional aspects, advantages and embodiments of the disclosure will become apparent to those skilled in the art from the following description of the various embodiments and related drawings.

BRIEF DESCRIPTION OF THE DRAWINGS

The present disclosure is described below with references to the accompanying drawings in which like elements are referenced with like numerals and in which.

DETAILED DESCRIPTION OF THE PREFERRED EMBODIMENTS

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present disclosure are not limited thereto and may also be applied in other industries, such as the gasification industry, to achieve similar results.

Figure 1A:
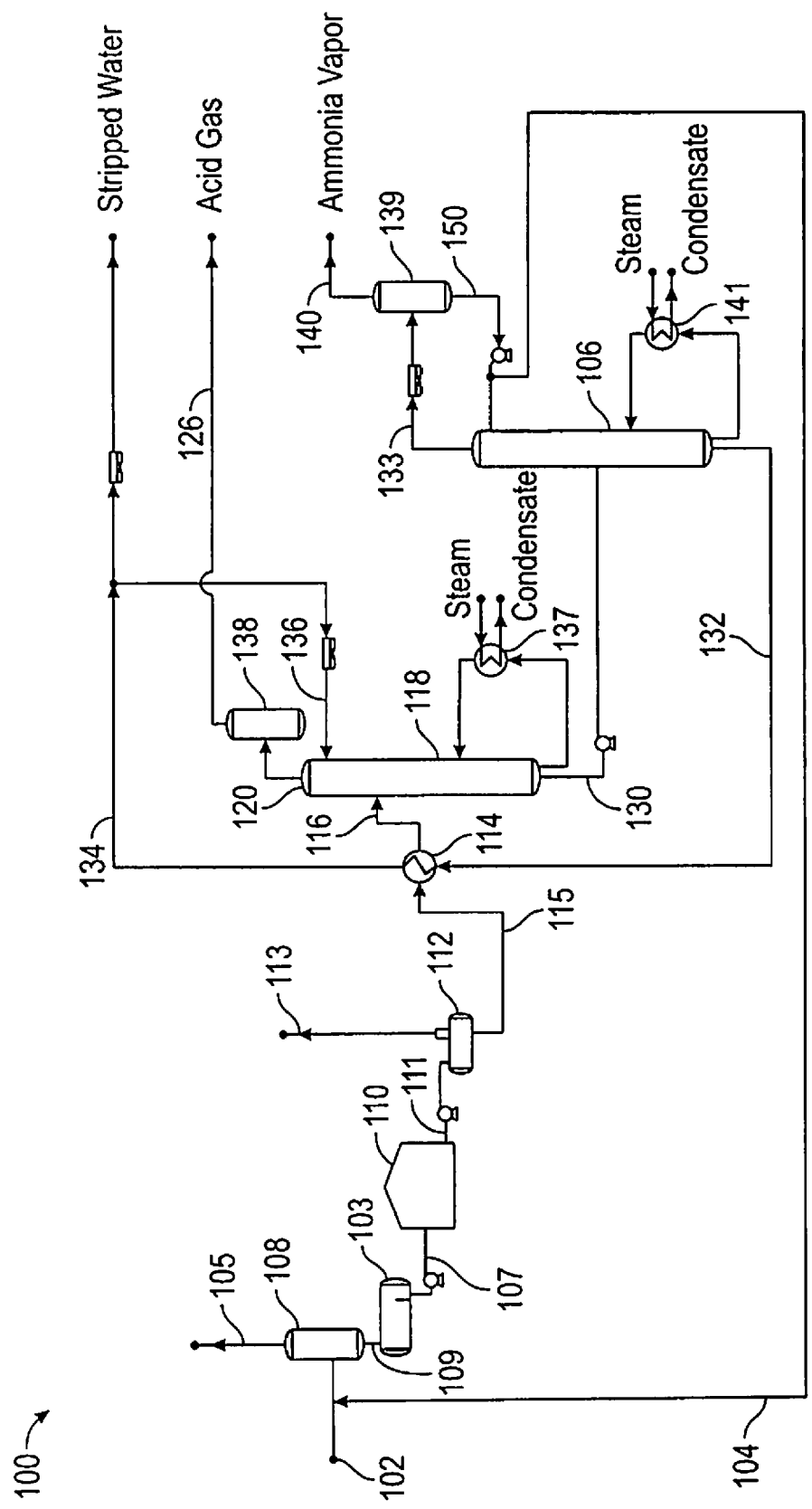
FIGS. 1A-1B are schematic diagrams illustrating a conventional two-column sour water stripping system.
Figure 1B:
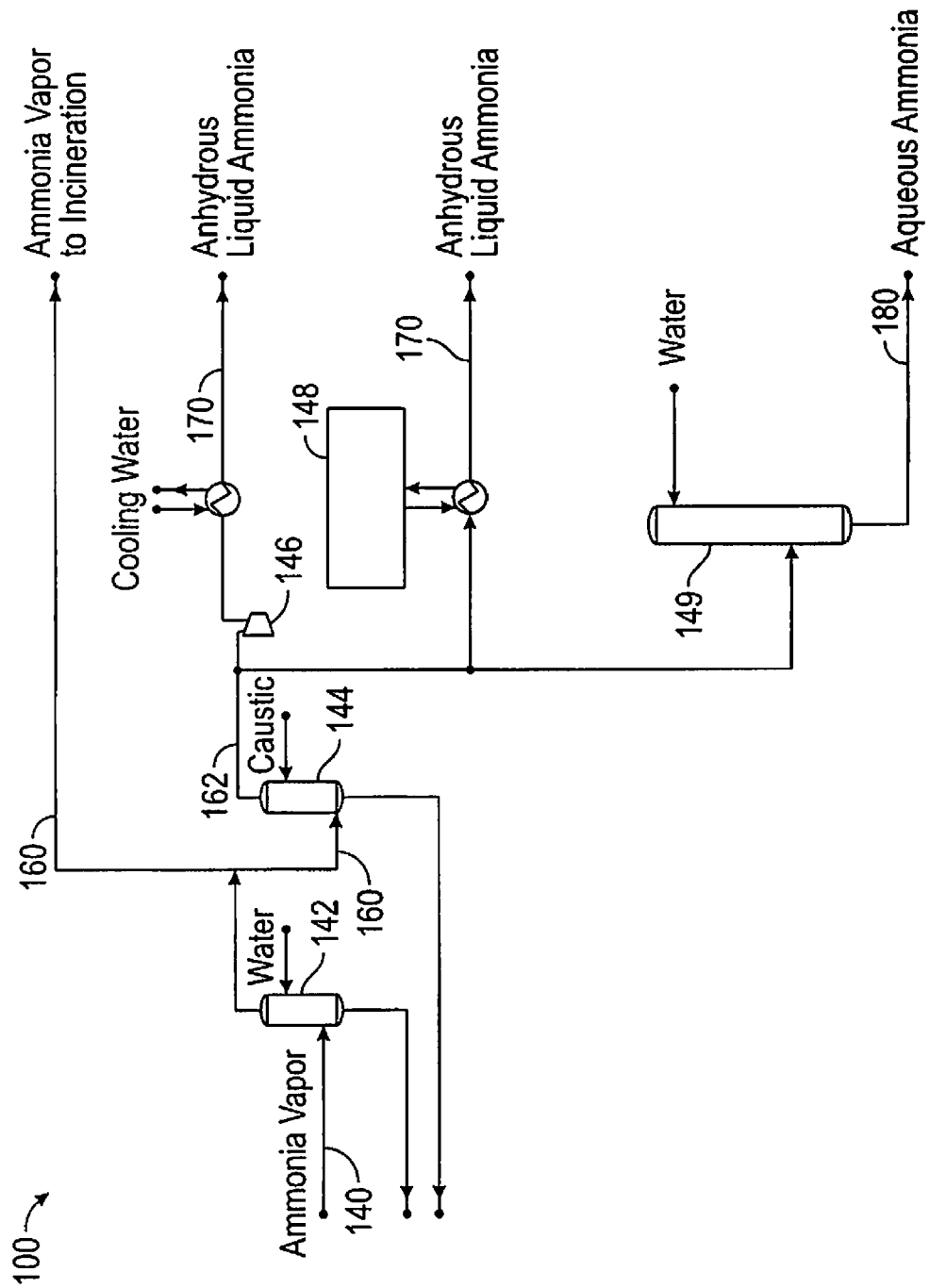
Figure 2:
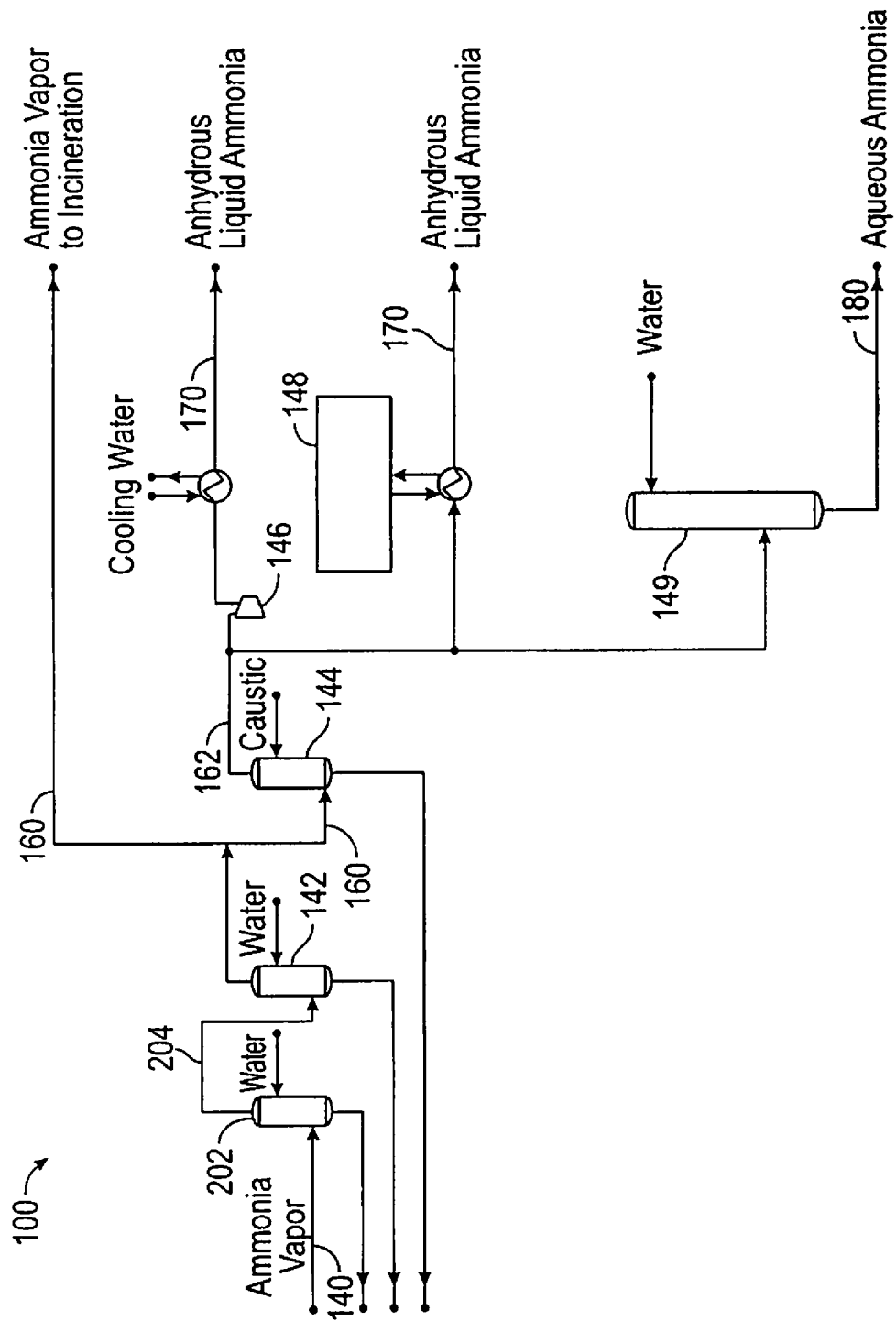
FIG. 2 is a schematic diagram illustrating the NH3 purification and liquefaction stage in FIG. 1B according to the present disclosure.

Referring now to FIG. 2, a schematic diagram of the NH3 purification and liquefaction stage in FIG. 1B illustrates the use of a warm water wash in a multi-stage water wash with varying temperatures to enhance the removal of CO2 from the ammonia stream. The warm water wash 202 is positioned upstream of the cool water wash 142 illustrated in FIG. 2 and downstream of the knock-out drum 139 illustrated in FIG. 1A. Preferably, the distance between the warm water wash 202 and an upstream unit (e.g. knock-out drum 139) is less than the distance between the warm water wash 202 and the cool water wash 142. In addition, the distance between the warm water wash 202 and the upstream unit is preferably no greater than about ten feet. The warm water wash 202 operates at substantially the same temperature as the incoming NH3 vapor stream 140, however, may vary between about ±25° F. The NH3 vapor stream 140 is thus sent to the warm water wash 202 to primarily remove CO2 and some residual amounts of H2S. The warm water wash 202 produces a CO2 scrubbed NH3 vapor stream 204 that is sent to the cool water wash 142 where it is processed in the same manner as described in reference to FIG. 1B. The water feed for the warm water wash 202 and the cool water wash 142 is preferably fresh water, however, may include recycled water. The contaminated liquid streams from the bottom of the warm water wash 202 and the cool water wash 142, if present, are preferably returned to the NH3 stripper 106, however, may be returned to any component upstream of the warm water wash 202 and/or the warm water wash 202. The water feed for the warm water wash 202 and/or the contaminated liquid stream from the bottom of the water wash 202 maintain the operating temperature of the warm water wash 202.

Because of the position of the warm water wash 202 and its operating temperature, the vapor phase concentration of CO2 in the CO2 scrubbed NH3 vapor stream 204 is reduced by at least 5% compared to the vapor phase concentration of CO2 in the NH3 vapor stream 140. The reduced levels of CO2 in the CO2 scrubbed NH3 vapor stream 204 will likewise, reduce the formation and deposit of salts in in any downstream unit (e.g. cool water wash 142). Any conventional two-column sour water stripping process may be easily retrofitted with a warm water wash.

Although there is a cost associated with the addition of a warm water wash to a conventional two-column sour water stripping process, it is more economical and efficient than conventional approaches such as, for example: i) using two cool water washes in parallel, such that one can be in operation while the other is being cleaned of salts; ii) increasing the flow of chilled water, which would not help the thermodynamics of salt formation; iii) eliminating the cool water wash to rely only on the downstream caustic wash, which significantly increases the operating costs in the form of caustic consumption; iv) flaring the NH3 vapor stream during the upset caused by salt obstructions, resulting in lost revenue of ammonia sales; and v) shutting down the NH3 purification and liquefaction stage for cleaning. In fact, the cool water wash may even be eliminated under certain conditions.

Conventional two-column sour water stripping systems have been around since the 1960's. Application of such systems has been limited to lower concentrations of carbon dioxide, such as refinery sour waters, due to concerns about ammonia-water-carbon dioxide salt formation. However, higher concentrations of CO2 are often found in gasification sour waters and may be useful in a two-column sour water stripping system for improving the H2S stripping. This explains why the need for enhanced separation of carbon dioxide and ammonia in the two-column sour water stripping system has been unresolved since the 1960's.

The invention claimed is:

1. A system for separating carbon dioxide from ammonia, which comprises:
    an ammonia vapor stream, wherein a temperature of the ammonia vapor stream is about 90° F. to about 140° F. and the ammonia vapor stream comprises ammonia and carbon dioxide;
    a water wash downstream from the ammonia vapor stream, wherein an operating temperature in the water wash is within about ±25° F. of a temperature of the ammonia vapor stream;
    a carbon dioxide scrubbed ammonia vapor stream downstream from the water wash, the carbon dioxide scrubbed ammonia vapor stream comprising ammonia and trace amounts of carbon dioxide; and
    another water wash downstream from the carbon dioxide scrubbed ammonia vapor stream, wherein a distance between the water wash and an upstream knock-out drum is less than a distance between the water wash and the another water wash.

2. The system of claim 1, wherein the operating temperature in the water wash is within about ±5° F. of the temperature of the ammonia vapor stream.

3. The system of claim 1, further comprising at least one of a water feed connected to the water wash and a contaminated liquid stream from a bottom of the water wash for maintaining the operating temperature in the water wash.

4. The system of claim 1, wherein the carbon dioxide scrubbed ammonia vapor stream comprises at least 5% less carbon dioxide than the ammonia vapor stream.

5. The system of claim 2, wherein the operating temperature in the water wash is substantially the same as the temperature of the ammonia vapor stream.

6. The system of claim 1, wherein the distance between the water wash and the upstream knock-out drum is no greater than ten feet.

7. The system of claim 1, wherein an operating temperature in the another water wash is at least 5° F. below the operating temperature in the water wash.

8. The system of claim 7, wherein the operating temperature in the another water wash is about 40° F. to about 60° F.

9. A method for separating carbon dioxide and ammonia, which comprises:
    introducing an ammonia vapor stream into a water wash, wherein a temperature of the ammonia vapor stream is about 90° F. to about 140° F. and the ammonia vapor stream comprises ammonia and carbon dioxide;
    introducing at least one of water and a contaminated liquid stream from a bottom of the water wash into the water wash at a temperature that is within about ±25° F. of a temperature of the ammonia vapor stream; and
    separating carbon dioxide and the ammonia in the ammonia vapor stream using at least one of the water and the contaminated liquid stream, which forms a carbon dioxide scrubbed ammonia vapor stream and the contaminated liquid stream.

10. The method of claim 9, wherein the temperature of at least one of the water and the contamination liquid stream is within about ±5° F. of the temperature of the ammonia vapor stream.

11. The method of claim 10, wherein the temperature of at least one of the water and the contamination liquid stream is substantially the same as the temperature of the ammonia vapor stream.

12. The method of claim 9, wherein the carbon dioxide scrubbed ammonia vapor stream comprises at least 5% less carbon dioxide than the ammonia vapor stream.

* * * * *